(12) United States Patent
Van de Velde et al.

(10) Patent No.: US 9,781,035 B2
(45) Date of Patent: *Oct. 3, 2017

(54) TRANSITIONING BETWEEN COMMUNICATION PROTOCOLS BETWEEN NETWORKS

(71) Applicant: CISCO TECHNOLOGY, INC., San Jose, CA (US)

(72) Inventors: Gunter Johan Van de Velde, Lint (BE); William Mark Townsley, Paris (FR); Ole Troan, Oslo (NO); Keyur P. Patel, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 14/842,085

(22) Filed: Sep. 1, 2015

(65) Prior Publication Data

US 2015/0372913 A1    Dec. 24, 2015

Related U.S. Application Data

(63) Continuation of application No. 13/872,777, filed on Apr. 29, 2013, now Pat. No. 9,191,318.

(51) Int. Cl.
| | |
|---|---|
| H04L 12/28 | (2006.01) |
| H04L 12/749 | (2013.01) |
| H04L 12/46 | (2006.01) |
| H04L 12/66 | (2006.01) |
| H04L 29/12 | (2006.01) |
| H04L 12/715 | (2013.01) |
| H04L 12/751 | (2013.01) |

(52) U.S. Cl.
CPC ........ H04L 45/741 (2013.01); H04L 12/4633 (2013.01); H04L 12/66 (2013.01); H04L 45/04 (2013.01); H04L 61/251 (2013.01); H04L 61/2592 (2013.01); H04L 45/02 (2013.01)

(58) Field of Classification Search
CPC combination set(s) only.
See application file for complete search history.

(56) References Cited

U.S. PATENT DOCUMENTS

| | | |
|---|---|---|
| 7,305,481 B2 | 12/2007 | Blanchet et al. |
| 7,733,876 B2 | 6/2010 | Davie et al. |

(Continued)

OTHER PUBLICATIONS

Cui et al, Tunnel-Based IPv6 Transition, IEEE, 7 pages, Mar./Apr. 2013.*

(Continued)

Primary Examiner — Frank Duong

(57) ABSTRACT

A method is provided in one particular example and may include obtaining routing information for a plurality of Internet Protocol (IP) addresses in a first network that natively supports a first Internet protocol, the routing information for the plurality of IP addresses in the first network further comprising an additional IP address in the first network and an indication that the additional IP address in the first network is to be used as a tunnel endpoint within the first network for receiving data destined to any of the plurality of IP addresses in the first network; and sending data destined to any one of the plurality of IP addresses in the first network to the additional IP address in the first network.

21 Claims, 7 Drawing Sheets

(56) References Cited

U.S. PATENT DOCUMENTS

| | | |
|---|---|---|
| 7,953,076 B2 | 5/2011 | Kim et al. |
| 8,798,060 B1 | 8/2014 | Vautrin et al. |
| 9,191,318 B1 | 11/2015 | Van de Velde et al. |
| 2004/0052257 A1 | 3/2004 | Abdo et al. |
| 2004/0162909 A1 | 8/2004 | Choe et al. |
| 2006/0092964 A1 | 5/2006 | Park et al. |
| 2007/0147421 A1 | 6/2007 | Kim |
| 2012/0213220 A1 | 8/2012 | Troan et al. |
| 2014/0086254 A1* | 3/2014 | Hardie .................. H04L 45/60 370/400 |

OTHER PUBLICATIONS

G. Van de Velde, et al., "BGP Remote-Next-Hop," IDR, Internet-Draft, Oct. 22, 2012, 17 pages; http://tools.ietf.org/pdf/draft-vandevelde-idr-remote-next-hop-03.pdf.

* cited by examiner

TRANSITIONING BETWEEN COMMUNICATION PROTOCOLS BETWEEN NETWORKS

RELATED APPLICATION

This Application is a continuation (and claims the benefit of priority under 35 U.S.C. §120) of U.S. application Ser. No. 13/872,777, filed Apr. 29, 2013, entitled "TRANSITIONING BETWEEN COMMUNICATION PROTOCOLS BETWEEN NETWORKS," Inventors Gunter Johan Van de Velde, et al. The disclosure of the prior application is considered part of (and is incorporated in its entirety by reference in) the disclosure of this application.

TECHNICAL FIELD

This disclosure relates in general to communication protocols across networks and, more particularly, to transitioning between communication protocols and between networks.

BACKGROUND

The communications industry is rapidly changing to adjust to emerging technologies and ever increasing customer demand. This customer demand for new applications and increased performance of existing applications is driving communication networks and system providers to employ networks and systems having greater speed and capacity (e.g., greater bandwidth). In trying to achieve these goals, a common approach taken by many communications providers is to use packet switching technology. Internet Protocol version 4 (IPv4) is widely deployed and used in local and wide area networks, including the Internet, to communicate information. Internet Protocol Version 6 (IPv6) is a version of the Internet Protocol that is designed to succeed IPv4. However, the headers of IPv4 and IPv6 are significantly different and, therefore, these protocols do not interoperate directly.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one particular example and may include obtaining routing information for a natively supported Internet protocol of a first network that uses a first routing policy; identifying a route with a tunnel endpoint using the routing information, where the tunnel endpoint supports transitioning between a plurality of Internet protocols; generating tunnel information for the route; and sending the route and the tunnel information to a network element in a second network that uses a second routing policy.

EXAMPLE EMBODIMENTS

Figure 1:
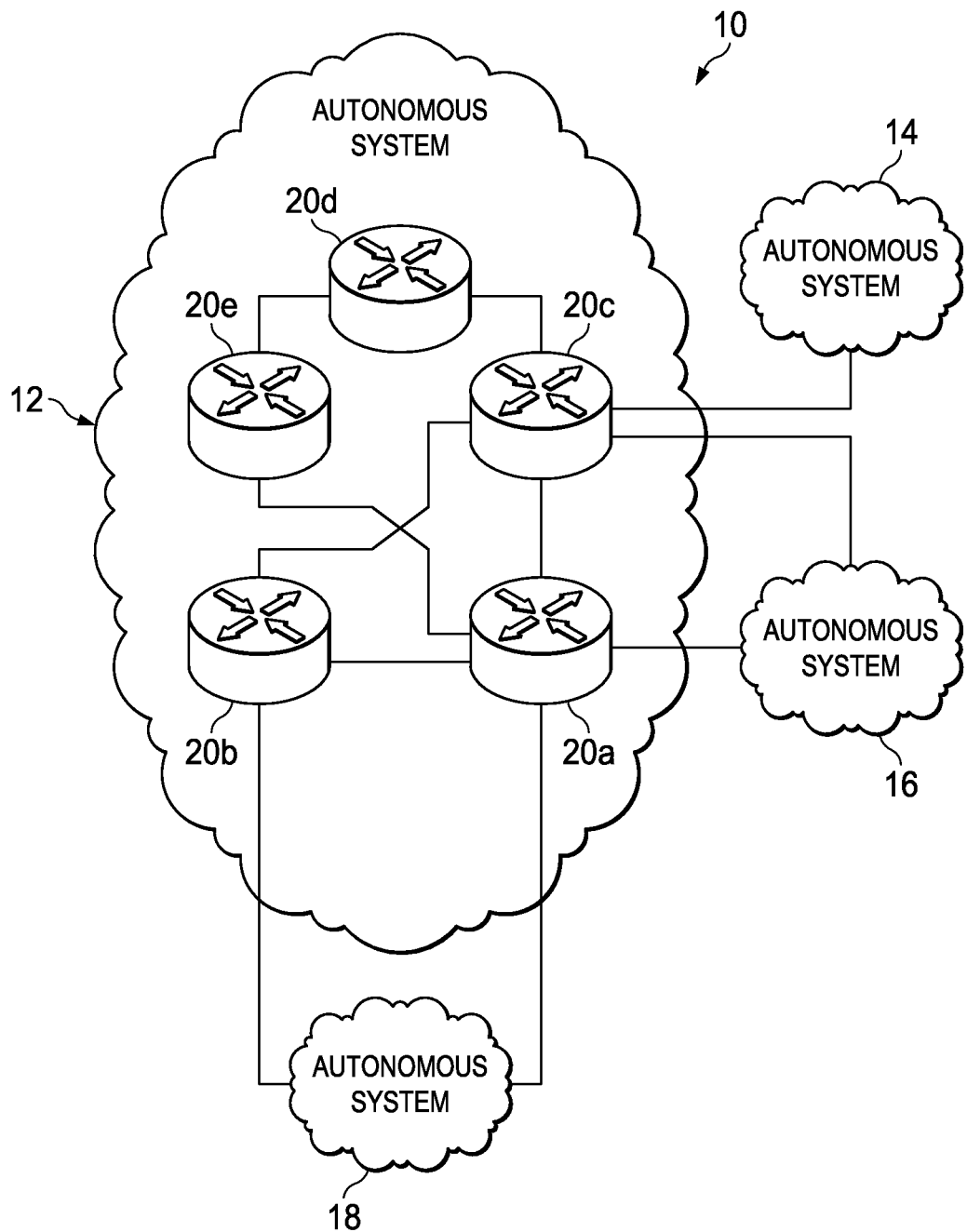
FIG. 1 is a simplified block diagram of an implementation of a communication system comprising a plurality of autonomous systems (AS) in accordance with one example embodiment.

FIG. 1 is a simplified block diagram of an implementation of a communication system 10 comprising a plurality of autonomous systems (AS) in accordance with one example embodiment. Communication system 10 may comprise one or more autonomous systems 12-18 interconnected by a plurality of routers 20. Routers 20 may be intermediate network nodes, which may further comprise switches. Autonomous systems 12-18 (also referred to as routing domains) are illustratively interconnected by routers 20a-c via, for example, such as frame relay links, asynchronous transfer mode links, other serial links, etc. Autonomous systems 12-18 may be networked systems defined by a collection of connected Internet Protocol (IP) routing prefixes under the control of one or more network operators that presents a common, clearly defined routing policy to the Internet.

Routers 20a-c of AS 12 may be coupled to routers 20d-e via interior networks, such as any number of local area networks. Exchanging discrete data packets or messages in accordance with predefined protocols, such as the Transmission Control Protocol/Internet Protocol (TCP/IP), typically effects communication among routers 20. It should be understood that other protocols, such as the Internet Packet Exchange (IPX) protocol, may be advantageously used with the different embodiments of the present disclosure.

Routing decisions within each AS 12-18 may rely on a predetermined "interior" routing protocol (e.g., an interior gateway routing protocol (IGP)). One example of IGP is a conventional link-state protocol, such as the Open Shortest Path First (OSPF) or the Intermediate-System-to-Intermediate-System (ISIS) protocol. Autonomous systems 12-18 may all use separate IGPs. In addition, routing information may be exchanged between the ASs using an "exterior" gateway protocol (EGP), such as the Border Gateway Protocol (BGP) (e.g., BGP version 4). Routers 20a-c may be border routers (also referred to as BGP speakers, edge routers, or BGP-enabled routers). To that end, routers 20a-c can exchange routing information with other border routers that are not in the same AS using an external form of BGP (eBGP), while routers 20a-c (within an AS) exchange routing information using an internal form of BGP (iBGP).

Figure 2:
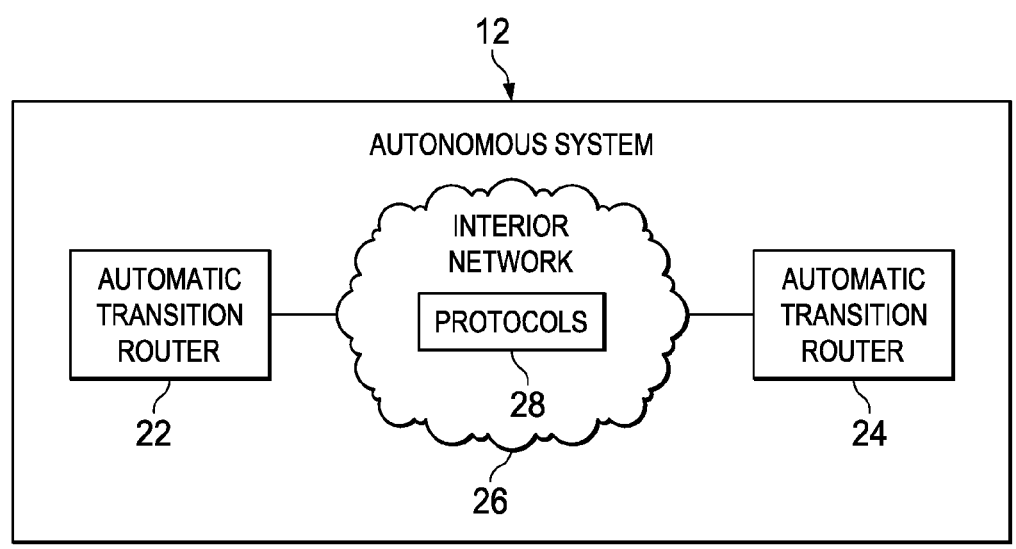
FIG. 2 is a simplified block diagram of an implementation of an autonomous system operating in accordance with one example embodiment.

FIG. 2 is a simplified block diagram of an implementation of autonomous system 12 operating in accordance with one example embodiment. As shown, autonomous system 12 may include automatic transition routers 22 and 24, communicatively coupled via an interior network 26 natively running one or more protocols 28. The term 'automatic' broadly includes any activity that could be triggered at an appropriate time (e.g., based on a pattern, a routine, the presence (or lack) of a condition, the detection of a certain scenario, etc.). Interior network 26 may include other packet switching devices and communications equipment. Routers 22 and 24 are described as "automatic transition" routers because they can include the automatic transition capability of one embodiment discussed herein, in addition to traditional capabilities of a router. Automatic transitioning capabilities can include, for example, the ability of a router or network to automatically discover and operate using native and non-native protocols, as described in one or more embodiments herein.

For illustrative purposes, autonomous system 12 is running an "N" number of different protocols used to communicate packets, such as, but not limited to, those of different Internet Protocol versions (e.g., IPv4, IPv6), or one or more network layers used to communicate packets between packet switching devices (e.g., bridges, routers). In one embodiment, protocols 28 of interior network 26 may refer to more than one protocol, so that the packet traffic of the N-1 protocols can be allocated and transported across these multiple native protocols. As used herein, the term "native" may refer to the basic protocol used for transporting packets in a network between routers (e.g., a layer-3 protocol that is used to communicate packets directly [i.e., not having to send over native protocol tunnels]). For example, if interior network 26 communicates packets only via IPv4 between automatic transition routers 22 and 24 and communicates IPv6 packets using IPv4 tunnels between automatic transition routers 22 and 24, then IPv4 is the native protocol and IPv6 is not a native protocol of interior network 26.

Each of automatic transition routers 22 and 24 may have all N protocols enabled on one or more interfaces, while interior network 26 may only communicate packets via protocols 28. Protocols 28 may overlap with N protocols of automatic transition routers 22 and 24. Accordingly, there are N-1 isolated islands of traffic supported by each of automatic transition routers 22 and 24, with the traffic being communicated over interior network 26, which natively communicates packets using protocols 28. Automatic transition routers 22 and 24 auto-discover each other and these N-1 protocol islands, and determine how to communicatively couple these N-1 protocol islands. Auto-discovery may be implemented on a routing protocol communicated across interior network 26. One embodiment may establish one or more protocol tunnels over interior network 26 between automatic transition routers 22 and 24, over which packets of these protocols may be communicated. Tunnels may be communication pathways along a route between tunnel endpoints, such as routers.

Further, interior network 26 can natively support one or more protocols, and the native protocol(s) that are used may change over time. For example, in a network that is transitioning between IPv4 to IPv6, the native protocol might initially be IPv4. However, as the configuration changes such that automatic transition routers 22 and 24 can communicate directly using IPv6 over interior network 26, then IPv6 may now be the native protocol. Additionally, in networks containing three or more automatic transition routers, there may be multiple native protocols (e.g., IPv4 between automatic transition routers A and B, and IPv6 between automatic transition routers B and C).

One or more embodiments can take into account and recognize that existing mechanisms may provide automated transitioning between different communication protocols in a network. Specifically, utilizing a routing topology within an IGP and a distributed algorithm to automatically determine potential tunnel ingress and egress locations for IPv6 over IPv4, or vice-versa within the same network, at the same time, based on the capabilities and configuration of network equipment. Certain embodiments discussed herein can provide the advantage of allowing auto-v6 to operate across AS boundaries.

One or more embodiments take into account and recognize that existing mechanisms may provide a variety of tunneling and IPv6 transition mechanisms. Certain embodiments discussed herein can offer backwards compatibility for incremental deployment and the ability to automatically eliminate tunneling when tunneling is no longer needed. This could stand in contrast to existing mechanisms that may require specific "sunsetting" procedures and are intended to be long-lived generic tunneling mechanisms for a variety of functionality (e.g., LISP, MPLS, L2TPv3, Softwires, etc). Additionally, existing mechanisms provide IPv6 tunneling protocols such as intra-site automatic tunneling addressing protocol (ISATAP), Teredo, 6to4, and others that utilize specific address ranges, require host participation beyond a generic IPv6 stack, require dedicated concentrator and relay functionality, etc.

Figure 3:
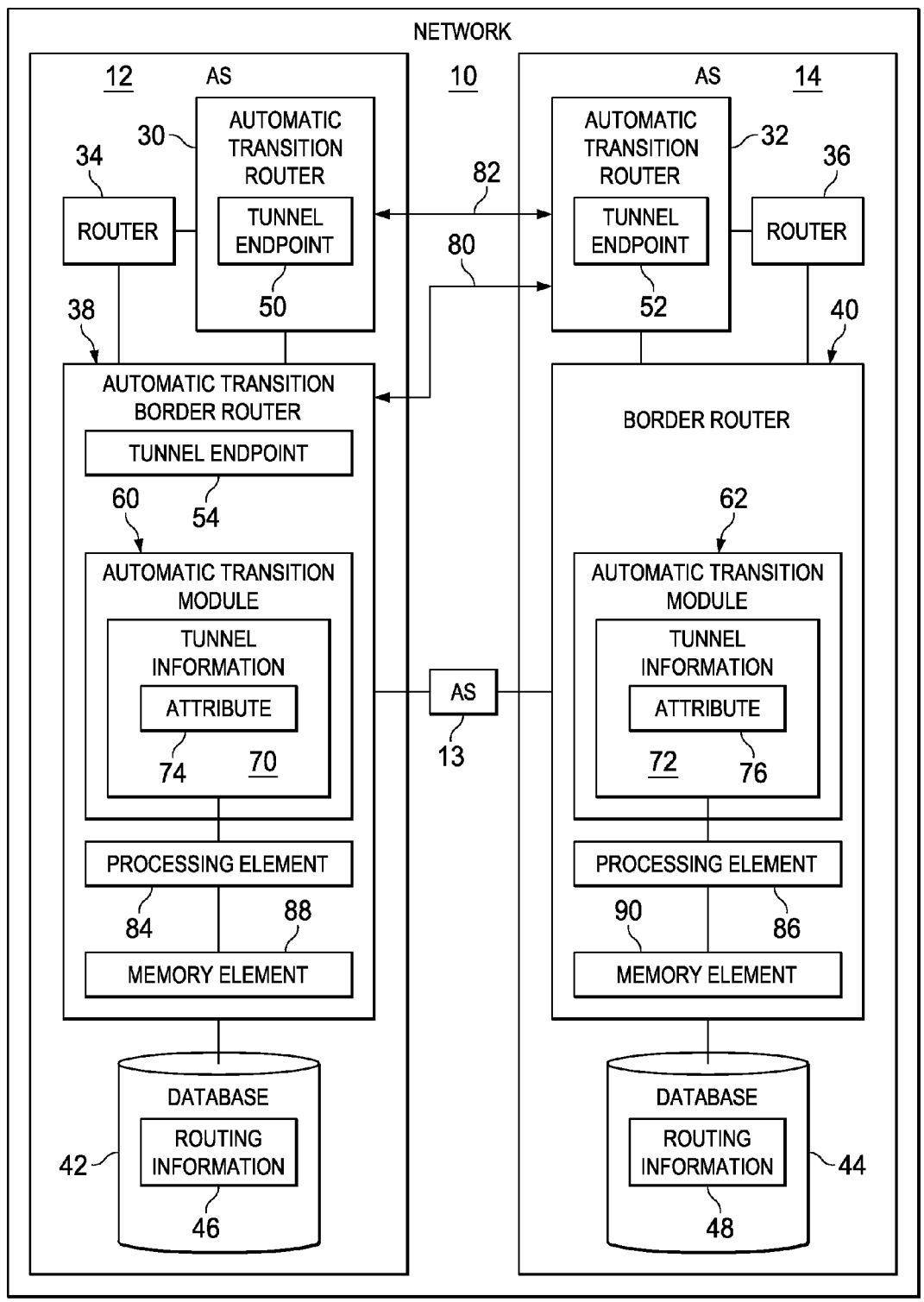
FIG. 3 is a simplified illustration of a communication system operating in accordance with one example embodiment.

FIG. 3 is a simplified illustration of communication system 10 operating in accordance with one example embodiment. Communication system 10 may comprise AS 12-14, or other autonomous systems, where appropriate and based on particular configuration needs. Autonomous system 12 may comprise an automatic transition router 30, a router 34, an automatic transition border router 38, and a database 42 with routing information 46. Similarly, autonomous system 14 may have an automatic transition router 32, a router 36, a border router 40, and a database 44 with routing information 48. Autonomous system 13 may be an autonomous system that does not contain any routers with automatic transitioning capabilities.

In different embodiments, autonomous systems 12 and 14 may be connected by border routers 38 and 40 via AS 13, or in other embodiments, via a cloud of multiple networks, point-to-point communication links, such as frame relay links, asynchronous transfer mode links, or any other serial links. Border routers 38 and 40 may be discoverable by each other. AS 12 and 14 may both be operable to use automatic transitioning, while they may be separated by multiple networks without automatic transitioning capabilities, such as AS 13.

Automatic transition routers 30 and 32 and border routers 38 and 40 may periodically advertise and discover other autonomous systems capable of automatic transitioning, including which protocols are not natively supported by a communicatively coupling network. Each router capable of automatic transitioning may be a tunnel endpoint in certain embodiments. For example, automatic transition router 30 may be tunnel endpoint 50, automatic transition router 32 may be tunnel endpoint 52, and automatic transition border router 38 may be tunnel endpoint 54. In an example, border router 40 may not be an endpoint because border router 40 may not be capable of automatic transitioning between Internet protocols. However, border router 40 may still be capable of in advertising a discovery with other autonomous systems by using automatic transition router 52 as a tunnel endpoint.

For the non-natively supported protocol(s) that require transportation over natively supported protocol(s), route(s) may be determined, based on routing information 48 and 48 in databases 42 and 44 (e.g., developed by communicating routing information via a routing protocol). In one embodiment, an optimized set of routes is determined, such as by using a shortest tunnel path first (e.g., least cost path over tunnels) or other optimization calculation. Additionally, when there are multiple non-native protocols, these calculations may be independent of each other, or considered together for determining the connectivity map among the automatic transition routers.

Routing information 48 and 48 may include information about a route or path to the autonomous system of which the routing information describes. For example, routing information 46 may include information necessary for automatic transition border router 38 to create a path or route to AS 12. An example of routing information may be network layer reachability information (NLRI). NLRI may be a prefix included in BGP routing update messages that describe a route and how to get there. A BGP-update message may include one or more NLRI prefixes and the attributes of a route for the NLRI prefixes; the route attributes include a BGP next hop gateway address, community values, and/or other information.

In an embodiment, border routers 38 and 40 may include automatic transition modules 60 and 62, respectively. Automatic transition modules 60 and 62 may be representative of different components of border routers 38 and 40, respectively. Automatic transition modules 60 and 62 of border routers 38 and 40, respectively, may be configured to generate tunnel information 70 and 72 using routing information 46 and 48, respectively. In an embodiment, tunnel information 70 and 72 may include information about automatic transitioning capabilities of AS 12 and 14. For example, tunnel information 70 may include an attribute 74 of at least one of an Internet protocol address, an origin network, a tunnel type, and encryption keys. The term "at least one of" may be defined as any combination of one or more items. For example, "at least one of A, B, and C" may include the combination of A, B, C, "A and B", "A and C", "B and C", and all of "A, B, and C". Likewise, tunnel information 72 may include attribute 76. Tunnel information 70 and 72 may include tunnel endpoints information about tunnel endpoints 50 and 52. A tunnel endpoint may be listed for any router capable of automatic transitioning.

Attributes 74 and 76 may include an Internet protocol (IP) address assigned for receipt of the tunnel traffic. For example, the IP address may be an IPv4 or IPv6 address. In an example, attributes 74 and 76 may be a BGP optional transitive attribute. The BGP optional transitive attribute may provide a mapping to complement and support mapping technologies (e.g., locator identification split protocol) by using BGP to distribute either an IP addresses attached to each entry in the BGP table. Based upon tunnel information 70 and 72, tunnels 80 and 82 (or overlay tunnel) can be utilized and created. Tunnels 80 and 82 could be any type of tunnel, such as, for example, IPv4 -in-IPv4 , IPv6 -in-IPv4 , IPv4 -in-IPv6 , IPv6 -in-IPv6 , or any other suitable tunnel.

Automatic transition border router 38 may communicate with border router 40 (across EGP boundaries), sometimes through many other autonomous systems, in order to enable auto discovery of automatic protocol transitioning capabilities across autonomous system borders. For example, automatic transition border router 38 may be configured to broadcast tunnel information 70, which may include tunnel endpoints 50 and 54, across AS boundaries (or EGP boundaries). In an embodiment, the tunnel endpoint may be an automatic transition router within AS 12, such as, for example, automatic transition border router 38 and automatic transition router 30. Therefore, automatic transition routers from other autonomous systems may create tunnels with automatic transitions border router 38 and automatic transition router 30.

In another embodiment, even non-automatic transition border routers may be configured to broadcast tunnel endpoints that are capable of automatic transitioning. For example, automatic transition module 62 of border router 40 may broadcast tunnel information 72 that may include an IP address for automatic transition router 32 as tunnel endpoint 52. Therefore, automatic transition routers from other autonomous systems may create tunnels with automatic transition router 30, even though border router 40 does not have automatic transition capabilities. However, if border router 40 was an automatic transition router, then border router 40 may also be a tunnel endpoint.

In different example implementations, the tunneling activities outlined herein may be implemented by logic encoded in one or more tangible media, which may include non-transitory media. For example, the activities outlined herein may be implemented by embedded logic provided in an application specific integrated circuit (ASIC), digital signal processor (DSP) instructions, software (potentially inclusive of object code and source code), firmware, and/or hardware to be executed by a processing elements 84 and 86, or other similar machine, etc. In some of these instances, memory elements 88 and 90 can store data used for the operations described herein. This includes memory elements 88 and 90 being able to store software, logic, code, or processor instructions that are executed to carry out the activities described in this disclosure.

Processing elements 84 and 86 can execute any type of instructions associated with the data to achieve the operations detailed herein in this disclosure. In one example, a processor could transform an element or an article (e.g., data) from one state or thing to another state or thing. In another example, the activities outlined herein may be implemented with fixed logic or programmable logic (e.g., software/computer instructions executed by processing elements 84-86) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof. Any of the potential processing elements, modules, and machines described in this disclosure should be construed as being encompassed within the broad term 'processing element.'

In more general terms, AS 12-14 and routers 30-40 are network elements that can facilitate the transitioning activities discussed herein. As used herein in this disclosure, the term 'network element' is meant to encompass any of the aforementioned elements, as well as switches, cable boxes, gateways, bridges, loadbalancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

The network elements in autonomous system 12 may further keep information, to be used in achieving the tunneling activities as discussed herein, in any suitable memory element (e.g., random access memory (RAM), read only memory (ROM), EPROM, EEPROM, ASIC, a disk drive, a floppy disk, a compact disk ROM (CD-ROM), a digital versatile disk (DVD), flash memory, a magneto-optical disk, other types of nonvolatile machine-readable media that are capable of storing data and information, etc.), software, hardware, firmware, or in any other suitable component, device, element, or object where appropriate and based on particular needs. Moreover, the information being used, tracked, sent, or received in autonomous system 12 could be provided in any database, register, queue, table, cache, or other storage structure, all of which can be provided in any suitable timeframe. Any of the memory items or storage options may be included within the broad term 'memory element' as used herein.

In operational terms, and in particular one embodiment uses existing tunneling technologies and provides a mechanism to use these as a solution to migrate from an initial protocol towards the new protocol and then "sunset" the initial protocol with minimal user intervention. For example, a router may use native IPv6 where possible and then use tunnels for other protocols by implementing automatic transitioning. One or more embodiments are capable of allowing multiple autonomous systems to communicate with one another using automatic transitioning while also allowing communication with non-automatic transitioning autonomous systems. In particular, only the participating automatic transitioning border routers may be modified to send and receive tunnel information, allowing automatic transitioning islands to be stitched together within a large enterprise (or over the Internet) in an incremental manner.

One or more embodiments may extend BGP routing information with an attribute. In an example, the attribute may be a BGP remote-next-hop attribute. A border router that generates routing information may add the BGP remote-next-hop attribute to provide remote tunnel information. This tunnel information (an IPv4 or IPv6 address, origin AS, tunnel type, keys, etc.) may then be used to send and receive tunneled traffic. Additionally, BGP origin AS authentication may be used to authenticate the originating border router of the tunnel information. The tunnel information allows propagation of data traffic through existing BGP networks.

In addition to the use of tunnel information, multipoint tunnel endpoints with automatic filtering may be created to facilitate the automatic transitioning. The automatic transition border router may create a tunnel interface with at least one IPv4/32 and IPv6/128 address assigned for receipt of tunnel traffic. In order to restrict automatic transitioning traffic to be sent and received only among automatic transitioning network, tunneled traffic may be automatically filtered based on the matching up of remote tunnel endpoint information in the BGP remote-next-hop attribute.

Hence, in accordance with certain embodiments presented herein, BGP can effectively be used to advertise tunnel endpoint information in a large enterprise network or the Internet without upgrading all BGP routers, which is common in other approaches. Additionally, certain embodiments enable an automatic filtering of traffic between participating networks. While access control list (ACL) filtering is not necessarily new, activities described herein allow ACLs to be automatically setup and provisioned. In addition, BGP origin AS authentication can provide additional security without need for a separate mapping database infrastructure.

Figure 4:
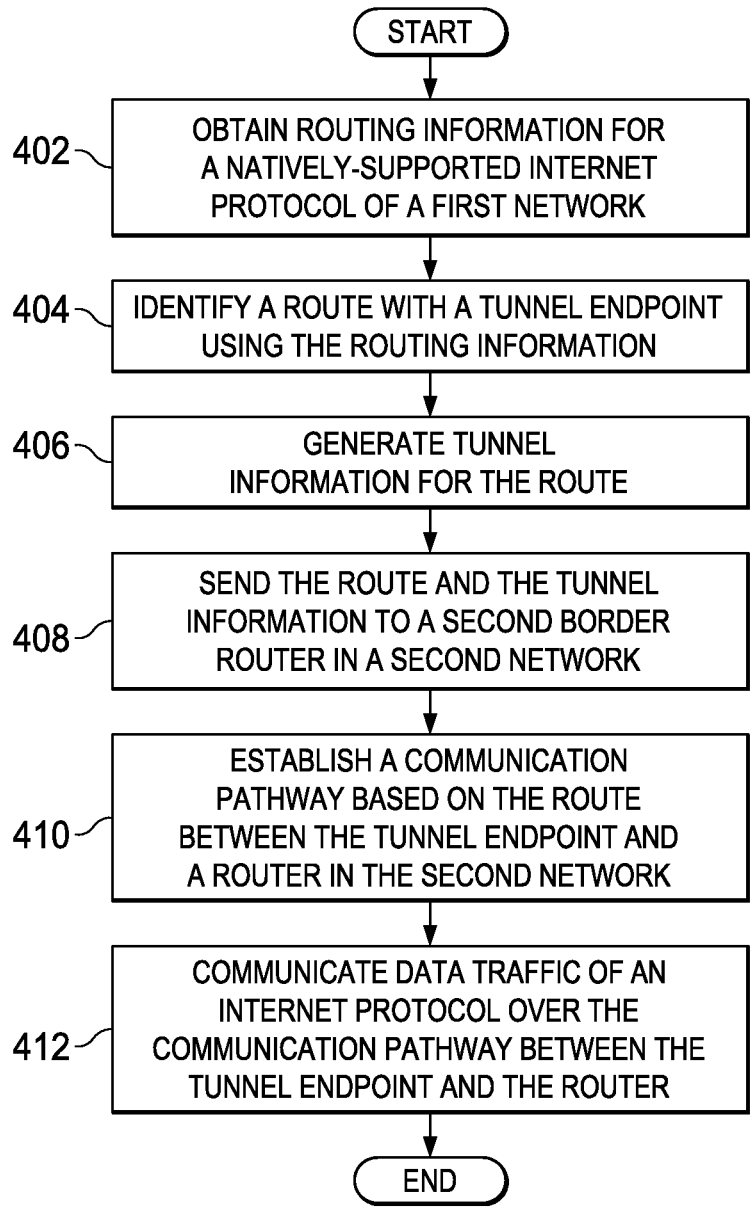
FIG. 4 is a simplified flowchart illustrating a method for managing inter-autonomous system communications in accordance with one example embodiment.

FIG. 4 is a simplified flowchart illustrating a method for managing inter-autonomous system communications in accordance with one example embodiment. A flow 400 may begin at step 402, where a first border router may obtain routing information for a natively supported Internet protocol of a first network (e.g., AS 12). At step 404, the first border router may identify a route with a tunnel endpoint using the routing information. In an embodiment, the tunnel endpoint supports automatic transitioning between a plurality of Internet protocols. The tunnel endpoint may be an automatic transition router, which may be the first border router or an interior router of the first network.

At step 406, the border router may generate tunnel information for the route. In an embodiment, tunnel information is at least one of an Internet protocol address, an origin network, a tunnel type, and encryption keys. The Internet protocol address may be one of an IPv4 address, IPv6 address, or some other suitable type of Internet protocol address. At step 408, the border router may send the route and the tunnel information to a second border router in a second network (e.g., AS 14). In an embodiment, the first network and second network use separate routing policies.

At 410, the border router may establish a communication pathway based on the routes between the tunnel endpoint and a router in the second network. At step 412, the border router may communicate data traffic of an Internet protocol over the communication pathway between the tunnel endpoint and the router. In an embodiment, the Internet protocol may be different from the natively supported Internet protocol. Additionally, the router may be an automatic transition router, which may be the second border router, an interior router of the second network, or another suitable router.

Figure 5:
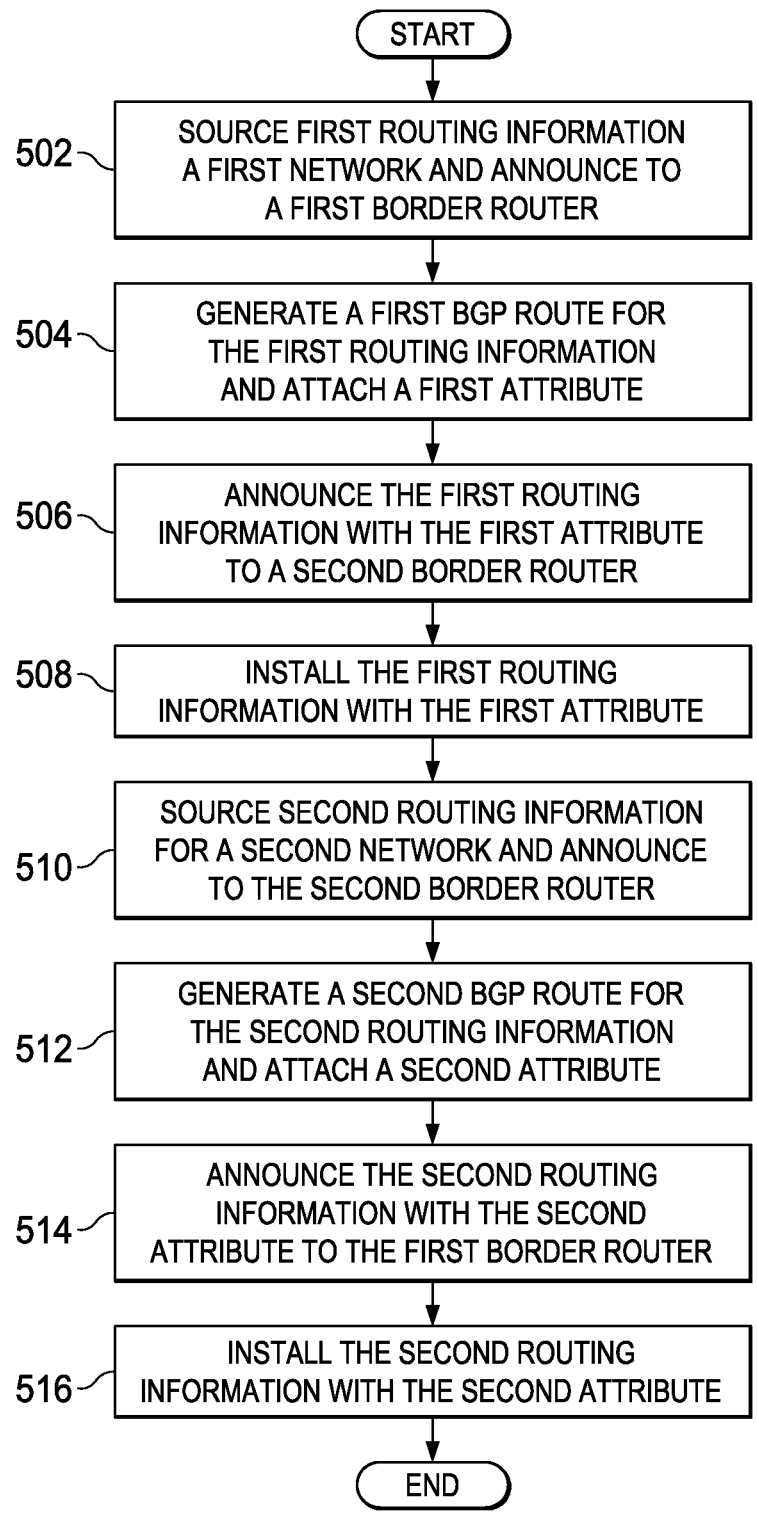
FIG. 5 is a simplified flowchart illustrating a method for setting up tunnels in accordance with one example embodiment.

FIG. 5 is a simplified flowchart illustrating a method for setting up tunnels in accordance with one example embodiment. A flow 500 may begin at step 502, a first network may source first routing information for the first network and announce to a first border router. For example, the first network, an autonomous system, may source network layer reachability information (NLRI) for the first network and announce it to the first border router.

At step 504, an automatic transition module of the first border router may generate a first BGP route using the first routing information and attach a first attribute. The combination of the route plus first attribute may be an example of tunnel information. The route may be a tunnel interface configured to receive tunnel traffic. The attribute may include an Internet protocol (IP) address assigned for receipt of the tunnel traffic. For example, the IP address may be an IPv4 or IPv6 address. In an example, the attribute may be a BGP optional transitive attribute. The BGP optional transitive attribute may provide a mapping to complement and support mapping technologies (e.g., locator identification split protocol) by using BGP to distribute either an IP addresses or tunnel end-points attached to each entry in the BGP table. Based upon the attribute, a tunnel (or overlay tunnel) can be utilized and created. This tunnel could be any type of IPv4 -in-IPv4 , IPv6 -in-IPv4 , IPv4 -in-IPv6 , IPv6 -in-IPv6 , or other suitable tunnel.

At step 506, the automatic transition module of the first border router may announce the first routing information with the first attribute to a second border router. The second border router may be in a second network, such as another autonomous system. At step 508, the second border router may install the first routing information with the first attribute. In an embodiment, the second router may also install an IP address of the first attribute into a filter list. At step 508, the second border router may install the first routing information with the first attribute. The routing information may be installed into a database.

At step 510, the second network may source second routing information for the second network and announce to a second border router. For example, the second network, an autonomous system, may source network layer reachability information (NLRI) for the second network and announce it to the second border router. At step 512, an automatic transition module of the second border router may generate a second BGP route using the second routing information and attach a second attribute.

At step 514, the automatic transition module of the second border router may announce the second routing information with the second attribute to the first border router. The route may be a tunnel interface configured to receive tunnel traffic. The attribute may include an Internet protocol (IP) address assigned for receipt of the tunnel traffic. For example, the IP address may be an IPv4 or IPv6 address. In an example, the attribute may be a BGP optional transitive attribute. The BGP optional transitive attribute may provide a mapping to complement and support mapping technologies (e.g., locator identification split protocol) by using BGP to distribute either an IP addresses attached to each entry in the BGP table. Based upon the attribute, a tunnel (or overlay tunnel) can be utilized and created. This tunnel could be any type of IPv4 -in-IPv4 , IPv6 -in-IPv4 , IPv4 -in-IPv6 , IPv6 -in-IPv6 , or other suitable tunnel.

At step 516, the first border router may install the second routing information with the second attribute. Once the routing information and attributes are installed, the networks may communicate with each other through tunnels using automatic transitioning. Each network may periodically update its own routing information and attributes.

Figure 6:
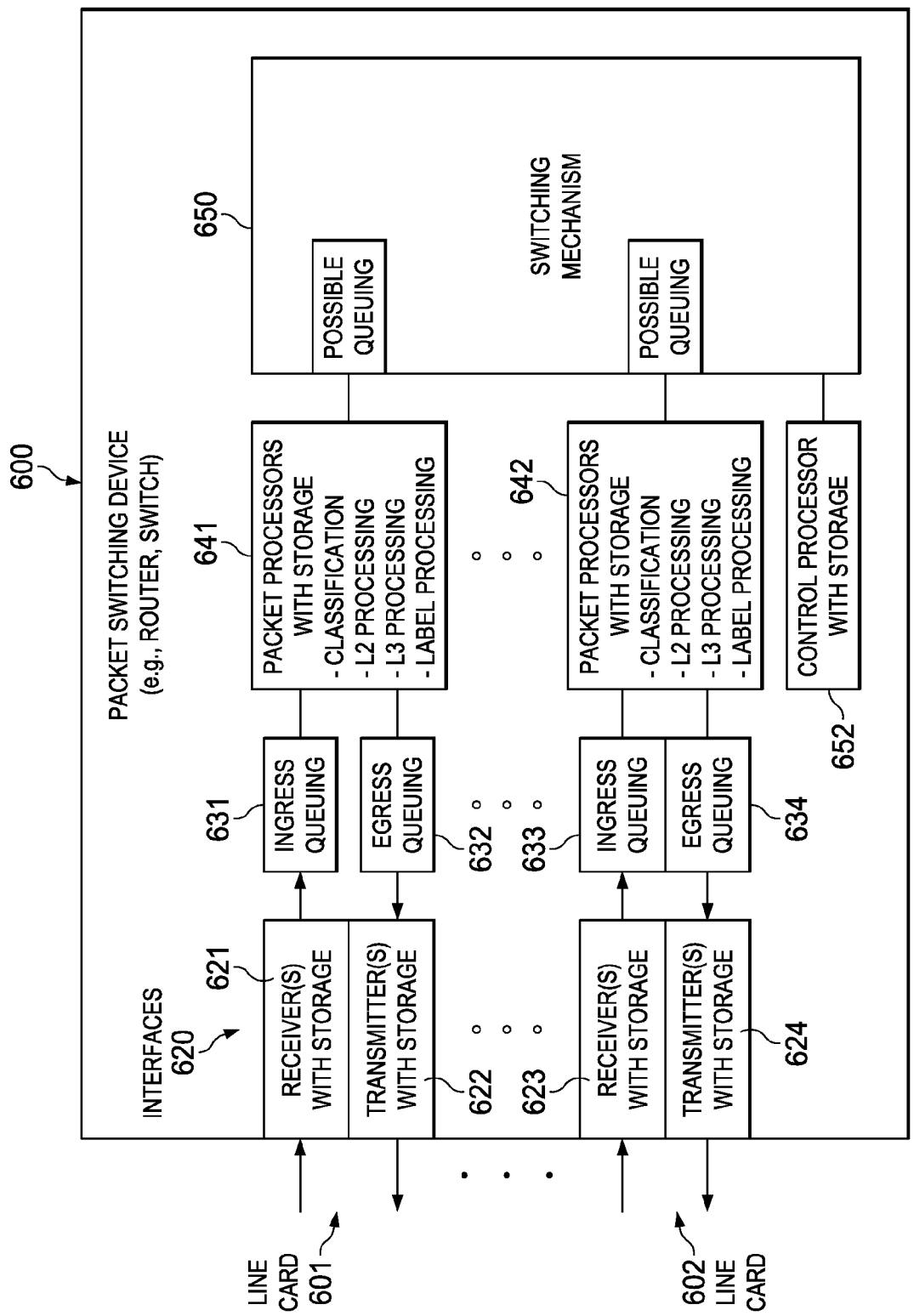
FIG. 6 is a simplified example of a packet switching device in accordance with an example embodiment.

FIG. 6 is a simplified example of a packet switching device 600, (e.g., router, automatic transition router, switch) in accordance with an example embodiment. As shown, packet switching device 600 comprises: line cards 601-602 that include ingress and egress interfaces 620, ingress/egress queuing 621-634, packet processors with storage 641-642; switching mechanism 650 (e.g., switch fabric, bus, crossbar) that may include input or output queues (or possibly these queues are located elsewhere, such as on a line cards 601-602); and control processor with storage 652.

In one embodiment, control processor 652 auto-discovers the automatic transition routers in a coupled network, such as by, but not limited to, sending and receiving information with other routers in the network. In one embodiment, the identification that a particular router supports the automatic transition capability of one embodiment (e.g., it is an "automatic transition router") is communicated over the native network via a routing protocol (e.g., Border Gateway Protocol, Interior Gateway Routing Protocol, Open Shortest Path First, Intermediate System-to-Intermediate System, Interior Gateway Protocol). For example, in one embodiment, this identification is carried in an opaque value, community attribute, or other value of a routing protocol.

Based on this information, which may include which one or more protocols that it supports that are not natively carried by the network (e.g., discovers the non-native protocol islands and to which automatic transition router(s) they are attached), control processor 652 determines communication paths that are needed among the automatic transition routers in the network, and causes these pathways (e.g., native protocol tunnels) to be established (or at least the ones that will terminate at automatic transition router 600). Control processor 652 communicates routing information, and forwards packets accordingly. These pathways are automatically updated in response to changes in the network. Note, the operation of one embodiment of automatic transition router 600 is described herein in relation to FIGS. 1-5 and 7.

Figure 7:
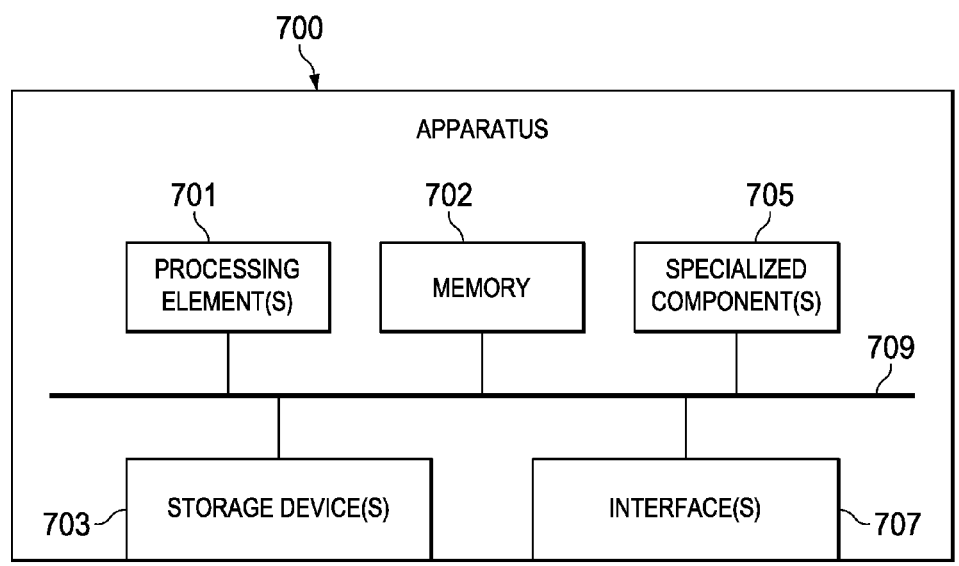
FIG. 7 is block diagram of an apparatus used in one embodiment associated with automated transitioning between different communication protocols in a network.

FIG. 7 is block diagram of an apparatus or component 700 used in one embodiment associated with automated transitioning between different communication protocols in a network. In one embodiment, apparatus or component 700 performs one or more processes corresponding to one of the flow diagrams and/or sequence of network changes illustrated or otherwise described herein.

In one embodiment, apparatus or component 700 includes one or more processing element(s) 701, memory 702, storage device(s) 703, specialized component(s) 705 (e.g. optimized hardware such as for performing operations, etc.), and interface(s) 707 for communicating information (e.g., sending and receiving packets, user-interfaces, displaying information, etc.), which are typically communicatively coupled via one or more communications mechanisms 709, with the communications paths typically tailored to meet the needs of the application. In one embodiment, an apparatus or component 700 is part of communication system 10 of FIG. 1.

Various embodiments of apparatus or component 700 may include more or less elements. Processing element(s) 701 using memory 702 and storage device(s) 703 typically controls the operation of apparatus or component 700 to perform one or more tasks or processes. Memory 702 is one type of computer-readable/computer-storage medium, and typically comprises random access memory (RAM), read only memory (ROM), flash memory, integrated circuits, and/or other memory components. Memory 702 typically stores computer-executable instructions to be executed by processing element(s) 701 and/or data that is manipulated by processing element(s) 701 for implementing functionality in accordance with an embodiment. Storage device(s) 703 are another type of computer-readable medium, and typically comprise solid state storage media, disk drives, diskettes, networked services, tape drives, and other storage devices. Storage device(s) 703 typically store computer-executable instructions to be executed by processing element(s) 701 and/or data that is manipulated by processing element(s) 701 for implementing functionality in accordance with an embodiment.

In view of the many possible embodiments to which the principles of this disclosure may be applied, it will be appreciated that the embodiments and aspects thereof described herein with respect to the drawings/figures are only illustrative and should not be taken as limiting the scope of the disclosure. For example, and is evident, many of the process block operations can be re-ordered to be performed before, after, or substantially concurrent with other operations. In addition, many different forms of data structures could be used in various embodiments. The disclosure as described herein contemplates all such embodiments as may come within the scope of the following claims and equivalents thereof.

In certain embodiments, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory media. In some of these instances, memory elements can store data used for the operations described herein. This includes the memory elements being able to store software, logic, code, or processor instructions that are executed to carry out the activities described herein.

In one embodiment, communication system 10, AS 12-14, and/or routers 30-40 may include software modules to achieve, or to foster, operations as outlined herein. In other embodiments, such operations may be carried out by hardware, implemented externally to these elements, or included in some other network device to achieve the intended functionality. Alternatively, these elements may include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the disclosure, to limit this disclosure in any way that is not otherwise reflected in the appended claims.

What is claimed is:

1. A method for assisting transitioning between communications protocols between a first network that natively supports a first communications protocol and a second network that natively supports a second communications protocol, the method comprising:
installing, at a network element within the second network, routing information for a plurality of Internet Protocol (IP) addresses in a first network, the routing information for the plurality of IP addresses in the first network comprising an additional IP address in the first network and an indication that the additional IP address in the first network is to be used as a tunnel endpoint within the first network for receiving data destined to any of the plurality of IP addresses in the first network; and
the network element within the second network sending data destined to any one of the plurality of IP addresses in the first network to a network element having the additional IP address in the first network.

2. The method according to claim 1, wherein sending data comprises sending the data via a tunnel between a second network and the additional IP address in the first network.

3. The method according to claim 1, further comprising the network element within the second network obtaining the routing information for the plurality of IP addresses in the first network by receiving a first Border Gateway Protocol (BGP) update message from the network element within the first network, the first BGP update message comprising the routing information for the plurality of IP addresses in the first network.

4. The method according to claim 1, further comprising sending, by the network element within the second network, routing information for a plurality of IP addresses in the second network, the routing information for the plurality of IP addresses in the second network comprising an additional IP address in the second network and an indication that the additional IP address in the second network is to be used as a tunnel endpoint within the second network for receiving data destined to any of the plurality of IP addresses in the second network.

5. The method according to claim 4, wherein sending the routing information for the plurality of IP addresses in the second network comprises sending a second BGP update message to the network element in the second network, the second BGP update message comprising the routing information for the plurality of IP addresses in the second network.

6. The method according to claim 4, further comprising:
establishing a communication pathway between the tunnel endpoint within the first network and the tunnel endpoint within the second network; and
communicating data traffic over the communication pathway between the tunnel endpoint within the first network and the tunnel endpoint within the second network.

7. An apparatus for assisting transitioning between communications protocols between a first network that natively supports a first communications protocol and a second network that natively supports a second communications protocol, the apparatus comprising:
a processor, and
a memory element communicatively connected to the processor and storing executable instructions which, upon execution by the processor, cause the apparatus to:
install, at a network element within the second network, routing information for a plurality of Internet Protocol (IP) addresses in a first network, the routing information for the plurality of IP addresses in the first network comprising an additional IP address in the first network and an indication that the additional IP address in the first network is to be used as a tunnel endpoint within the first network for receiving data destined to any of the plurality of IP addresses in the first network; and
send, by the network element within the second network, data destined to any one of the plurality of IP addresses in the first network to the additional IP address in the first network.

8. The apparatus according to claim 7, wherein sending data comprises sending the data via a tunnel between a second network and the additional IP address in the first network.

9. The apparatus according to claim 8, wherein the apparatus is a tunnel endpoint within the second network for the tunnel, and wherein the tunnel endpoint within the second network is one of a border router of the second network and an interior router of the second network.

10. The apparatus according to claim 7, wherein the routing information for the plurality of IP addresses in the first network is obtained by receiving a first Border Gateway Protocol (BGP) update message, the first BGP update message comprising the routing information for the plurality of IP addresses in the first network.

11. The apparatus according to claim 7, wherein the executable instructions, upon execution by the processor, further cause the apparatus to send, by the network element within the second network, routing information for a plurality of IP addresses in the second network, the routing information for the plurality of IP addresses in the second network comprising an additional IP address in the second network and an indication that the additional IP address in the second network is to be used as a tunnel endpoint within the second network for receiving data destined to any of the plurality of IP addresses in the second network.

12. The apparatus according to claim 11, wherein the routing information for the plurality of IP addresses in the second network comprises sending a second BGP update message to the network element in the second network, the second BGP update message comprising the routing information for the plurality of IP addresses in the second network.

13. The apparatus according to claim 11, wherein the executable instructions, upon execution by the processor, further cause the apparatus to:
    establish a communication pathway between the tunnel endpoint within the first network and the tunnel endpoint within the second network; and
    communicate data traffic over the communication pathway between the tunnel endpoint within the first network and the tunnel endpoint within the second network.

14. The apparatus according to claim 7, wherein the additional IP address in the first network comprises a first additional IP address in the first network and the routing information for the plurality of IP addresses in the first network further comprises a second additional IP address in the first network, and wherein the executable instructions, upon execution by the processor, cause the apparatus to:
    send the data destined to any one of the plurality of IP addresses in the first network via a tunnel between a tunnel endpoint within a second network and either the first additional IP address in the first network or the second additional IP address in the first network.

15. The apparatus according to claim 7, wherein the apparatus is a router in the second network.

16. The apparatus according to claim 15, wherein the router is an automatic transition router configured to automatically advertise and discover other networks capable of automatic transitioning between a plurality of Internet protocols.

17. One or more non-transitory tangible media encoded with executable instructions which, when executed by a processor, are operable to perform operations for assisting transitioning between communications protocols between a first network that natively supports a first communications protocol and a second network that natively supports a second communications protocol, the operations comprising:
    installing, at a network element within the second network, routing information for a plurality of Internet Protocol (IP) addresses in a first network, the routing information for the plurality of IP addresses in the first network comprising an additional IP address in the first network and an indication that the additional IP address in the first network is to be used as a tunnel endpoint within the first network for receiving data destined to any of the plurality of IP addresses in the first network; and
    sending, by the network element within the second network, data destined to any one of the plurality of IP addresses in the first network to the additional IP address in the first network.

18. The one or more non-transitory tangible media according to claim 17, wherein sending data comprises sending the data via a tunnel between a second network and the additional IP address in the first network.

19. The one or more non-transitory tangible media according to claim 17, wherein the routing information for the plurality of IP addresses in the first network is obtained by receiving a first Border Gateway Protocol (BGP) update message, the first BGP update message comprising the routing information for the plurality of IP addresses in the first network.

20. The one or more non-transitory tangible media according to claim 17, wherein the operations further comprise sending, by the network element within the second network, routing information for a plurality of IP addresses in the second network, the routing information for the plurality of IP addresses in the second network comprising an additional IP address in the second network and an indication that the additional IP address in the second network is to be used as a tunnel endpoint within the second network for receiving data destined to any of the plurality of IP addresses in the second network.

21. The one or more non-transitory tangible media according to claim 20, wherein sending the routing information for the plurality of IP addresses in the second network comprises sending a second BGP update message to the network element in the second network, the second BGP update message comprising the routing information for the plurality of IP addresses in the second network.

* * * * *